(12) United States Patent
Langewiesche

(10) Patent No.: US 10,954,987 B2
(45) Date of Patent: Mar. 23, 2021

(54) PLUG SCREW

(71) Applicant: SPAX INTERNATIONAL GMBH & CO. KG, Ennepetal (DE)

(72) Inventor: Frank Langewiesche, Sprockhövel (DE)

(73) Assignee: SPAX INTERNATIONAL GMBH & CO. KG, Ennepetal (DE)

(*) Notice: Subject to any disclaimer, the term of this patent is extended or adjusted under 35 U.S.C. 154(b) by 268 days.

(21) Appl. No.: 16/314,381

(22) PCT Filed: May 30, 2017

(86) PCT No.: PCT/EP2017/063042
§ 371 (c)(1),
(2) Date: Dec. 28, 2018

(87) PCT Pub. No.: WO2018/007069
PCT Pub. Date: Jan. 11, 2018

(65) Prior Publication Data
US 2019/0203756 A1 Jul. 4, 2019

(30) Foreign Application Priority Data
Jul. 6, 2016 (DE) .................. 10 2016 112 357

(51) Int. Cl.
*F16B 25/00* (2006.01)
*F16B 25/10* (2006.01)

(52) U.S. Cl.
CPC ...... *F16B 25/0084* (2013.01); *F16B 25/0015* (2013.01); *F16B 25/0047* (2013.01);
(Continued)

(58) Field of Classification Search
CPC .. F16B 25/00; F16B 25/0015; F16B 25/0047; F16B 25/0057; F16B 25/0078;
(Continued)

(56) References Cited

U.S. PATENT DOCUMENTS 1,369,156 A * 2/1921 Woodward .............. F16B 39/30
411/307
2,788,046 A * 4/1957 Rosan ..................... F16B 39/30
411/311
(Continued)

FOREIGN PATENT DOCUMENTS

| EP | 0102605 A1 | 3/1984 |
|---|---|---|
| EP | 0824198 A1 | 2/1998 |

(Continued)

*Primary Examiner* — Roberta S Delisle
(74) *Attorney, Agent, or Firm* — Medley, Behrens & Lewis, LLC

(57) ABSTRACT

The present invention relates to a screw, in particular a plug screw, having a screw shank (1), a screw head (2) and a tapering screw tip (4), and having a screw thread (6) that extends at least over a portion of the screw shank (1) and over the screw tip (4), the flight (6a) of said screw thread (6) having a triangular cross section as seen in longitudinal section, with two thread flanks (8, 9) that intersect at a flank tip (7). The flank tip (7) is rounded, wherein a radius of the rounding of the rounded flank tip (7) is selected to be from 1% to 10% of the nominal diameter of the screw. The thread flanks (8, 9) are each formed from two flank portions which enclose an obtuse angle with one another.

19 Claims, 5 Drawing Sheets

Figure 1:
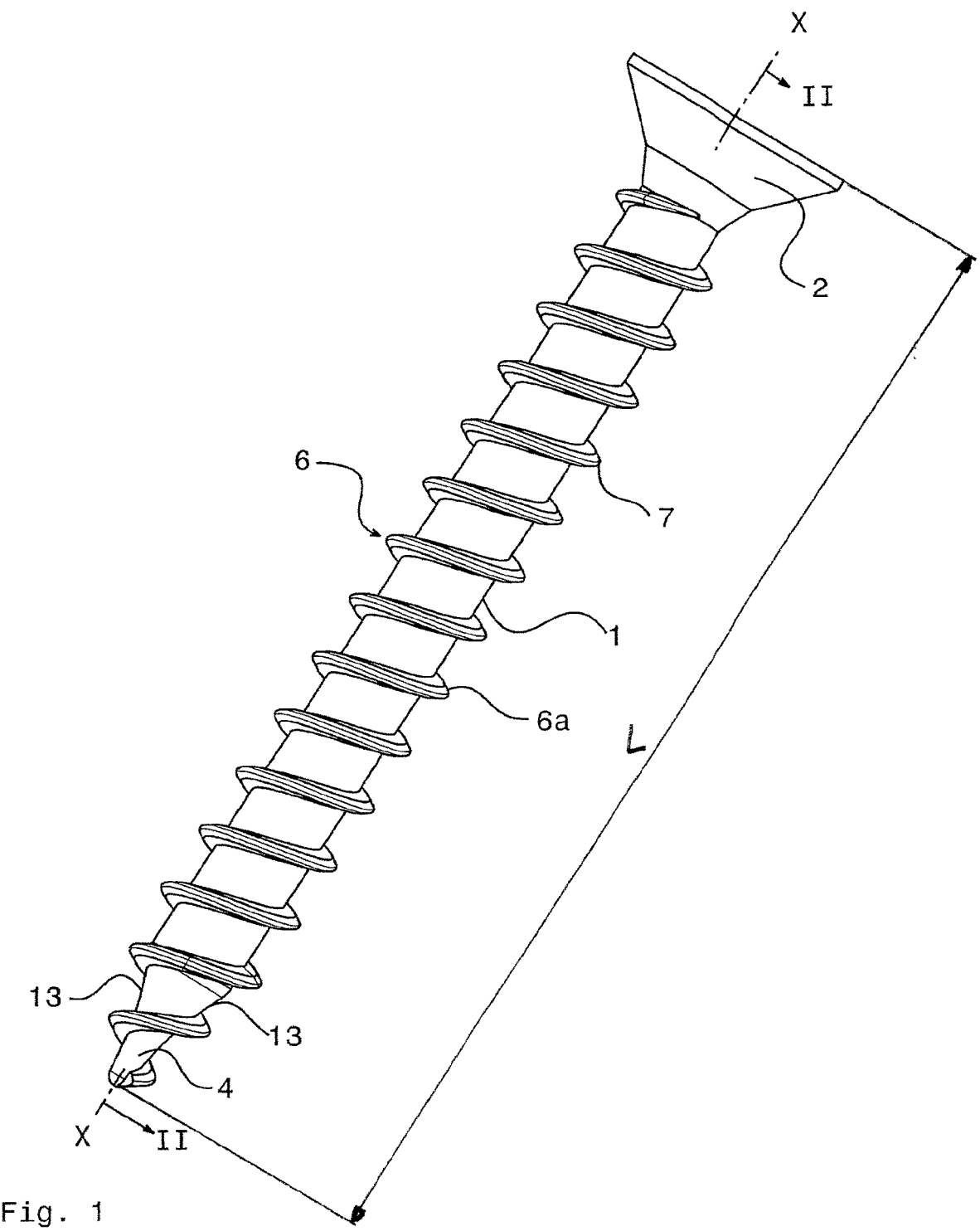

(52) U.S. Cl.
CPC ........ *F16B 25/0057* (2013.01); *F16B 25/103* (2013.01); *F16B 25/00* (2013.01)

(58) Field of Classification Search
CPC .... F16B 25/0084; F16B 25/10; F16B 25/103; F16B 33/02; F16B 35/041; F16B 35/065
USPC ................... 411/386, 411, 424, 426
See application file for complete search history.

(56) References Cited

U.S. PATENT DOCUMENTS

| | | | |
|---|---|---|---|
| 3,045,523 A | 7/1962 | Reed | |
| 3,323,402 A * | 6/1967 | Gowen, Jr. | F04B 53/101 411/411 |
| 4,549,754 A * | 10/1985 | Saunders | E21B 17/042 285/334 |
| 5,882,162 A * | 3/1999 | Kaneko | F16B 25/0031 411/411 |
| 7,677,854 B2 * | 3/2010 | Langewiesche | F16B 35/041 411/387.2 |
| 7,731,466 B2 * | 6/2010 | Shea | F16B 39/30 411/366.3 |
| 8,596,943 B2 * | 12/2013 | Matthiesen | F16B 25/106 411/386 |
| 2013/0034405 A1 * | 2/2013 | Hsu | F16B 25/0015 411/386 |
| 2015/0023761 A1 * | 1/2015 | Pritchard | F16B 25/0047 411/411 |

FOREIGN PATENT DOCUMENTS

| | | |
|---|---|---|
| EP | 1591675 A2 | 11/2005 |
| JP | 2007292193 A | 11/2007 |
| WO | 2012044259 A1 | 4/2012 |

* cited by examiner

PLUG SCREW

The present invention relates to a self-tapping screw, in particular to a dowel screw according to the preamble of claim 1.

Self-tapping screws are in widespread use and are used in particular for screwing into wooden or plastic parts. When used for screwing into stone or the like they are used in conjunction with plastic dowels, wherein the plastic dowel is inserted into a pre-drilled hole and the screw is then screwed in.

With these known self-tapping screws there exists the problem that the dowel during screwing-in is damaged such that its retaining function in the respective component is impaired. The weakening of the dowel is basically caused by the screw digging itself into the dowel wall such that the wall is weakened. With dowels which are both suitable as solid wall dowels and hollow wall dowels, the end-side so-called dowel nut may be damaged by the tip of the known screws.

The present invention is based on the requirement to propose a self-tapping screw, which reduces the danger of digging into the dowel wall, in particular if the screw is screwed in obliquely, and which moreover minimises damage to the end-side dowel nut in case of hollow-wall dowels.

According to the invention this is achieved in that the flank end of the thread turns on the screw shaft is rounded-off, wherein a radius of the rounding of the rounded-off flank end is present in a magnitude of 1% to 10% of the nominal diameter of the screw.

Due to the rounded-off flank end of the thread turns, the thread is prevented from cutting itself into the dowel wall such that it causes a partial or total destruction of the wall of the dowel. Advantageously the radius of the rounding of the rounded-off point of the thread turns is 2% of the nominal diameter of the screw.

Furthermore it is of advantage according to the invention if the thread flanks of the thread turns are each formed of two flank portions which together enclose an obtuse angle, wherein the flank portion beginning at the thread shaft has a radial height H1 perpendicular to the longitudinal axis of the screw shaft, and the adjoining flank portion has a radial height H2 perpendicular to the longitudinal axis of the screw shaft and ends in the rounded-off flank end, wherein the sum of H1 and H2 forms the thread height H of the thread turns. This inventive design results in an increased spreading effect, when screwing-in of the respective dowel is performed. Advantageously the radial height H1 is larger than/equal to 30% and smaller than/equal to 70% of the total height H of the thread turns and the radial height H2 is larger than/equal to 30% and smaller than/equal to 70% of the total height of the thread turns. According to the invention it is optimal if H1=H2.

Furthermore, according to the invention, it is convenient if the flank portions with a radial height H1, which lie opposite each other, enclose an acute angle of 20° to 40°, preferably 30°, when viewed in longitudinal section. Furthermore, according to the invention, it is of advantage if the opposing flank portions with a radial height H2 enclose an acute angle of 50° to 70°, preferably 50°. The above dimensioning of the respective angles, with are enclosed by the flank portions, optimises the spreading effect of the inventive screw in the dowel, and in addition it allows a slight penetration of the flanks of the thread turns into the "dowel nut".

According to the invention it is further of advantage if the screw tip at the end of the screw shaft is rounded-off with a rounding at its free end. Advantageously the radius of the rounding is 10% of the nominal diameter of the inventive screw, wherein advantageously the nominal diameter of the screw can be chosen to be in a range from 5% to 20%.

According to the invention it is further of advantage if the screw tip, viewed in longitudinal section, comprises concavely shaped side surfaces. Such a screw tip configured with a concave outline improves centring of the inventive screw during screwing into the so-called dowel nut of the hollow wall dowel and facilitates easy and secure screwing-in.

Viewed in longitudinal section the side surfaces of the screw tip advantageously enclose an acute angle W with a magnitude in a range from 20° to 40° at the point where they intersect. Further, it is of advantage if in a first portion of the screw tip adjoining the screw shaft, the side surfaces thereof enclose an angle W1 with a magnitude in a range from 20°-40°, in particular with of magnitude of 30°, and in an adjoining portion the side surfaces thereof enclose an angle W2 with a magnitude in a range from 10°-20°, in particular with a magnitude of 15°. Advantageously angle W is smaller than angle W1 and larger than angle W2.

According to the invention it is further of advantage if the screw tip, in the region of the screw tip and in an adjoining shaft region, comprises a larger pitch than in the remaining shaft region. This has the effect of achieving a quicker knotting and a better spreading of the dowel.

Furthermore, it may be of advantage to configure the screw as a partial-thread screw.

Figure 3:
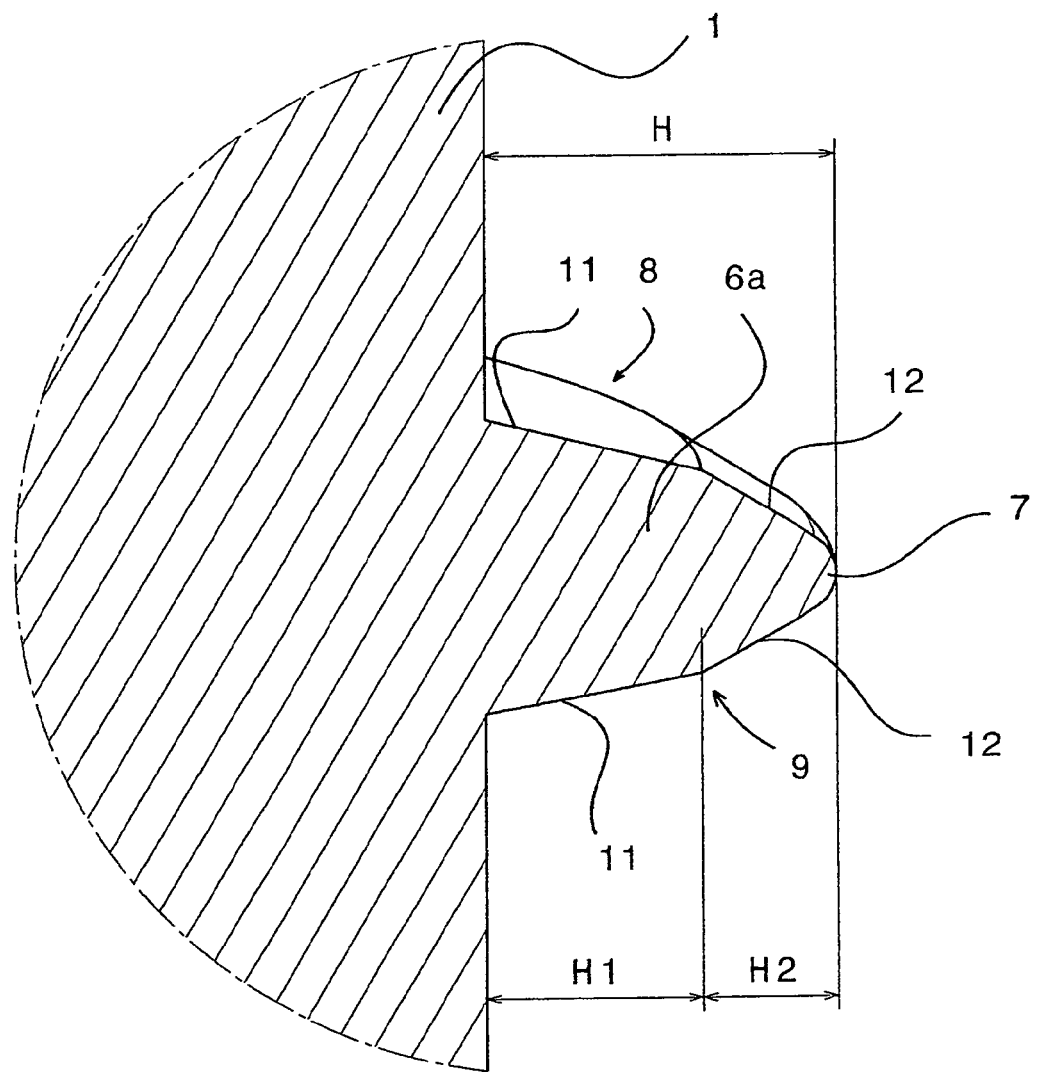
Figure 4:
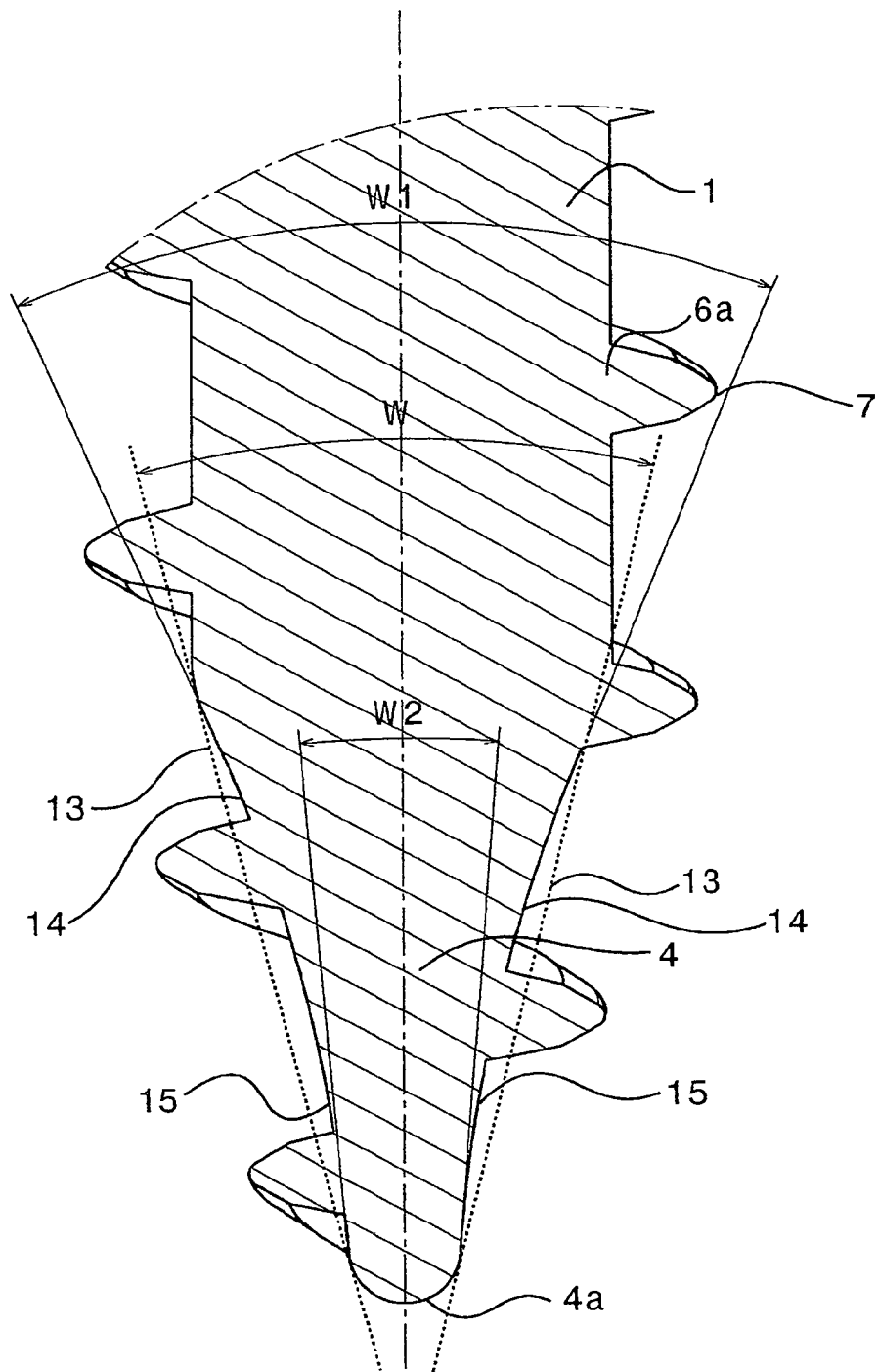
Figure 5:
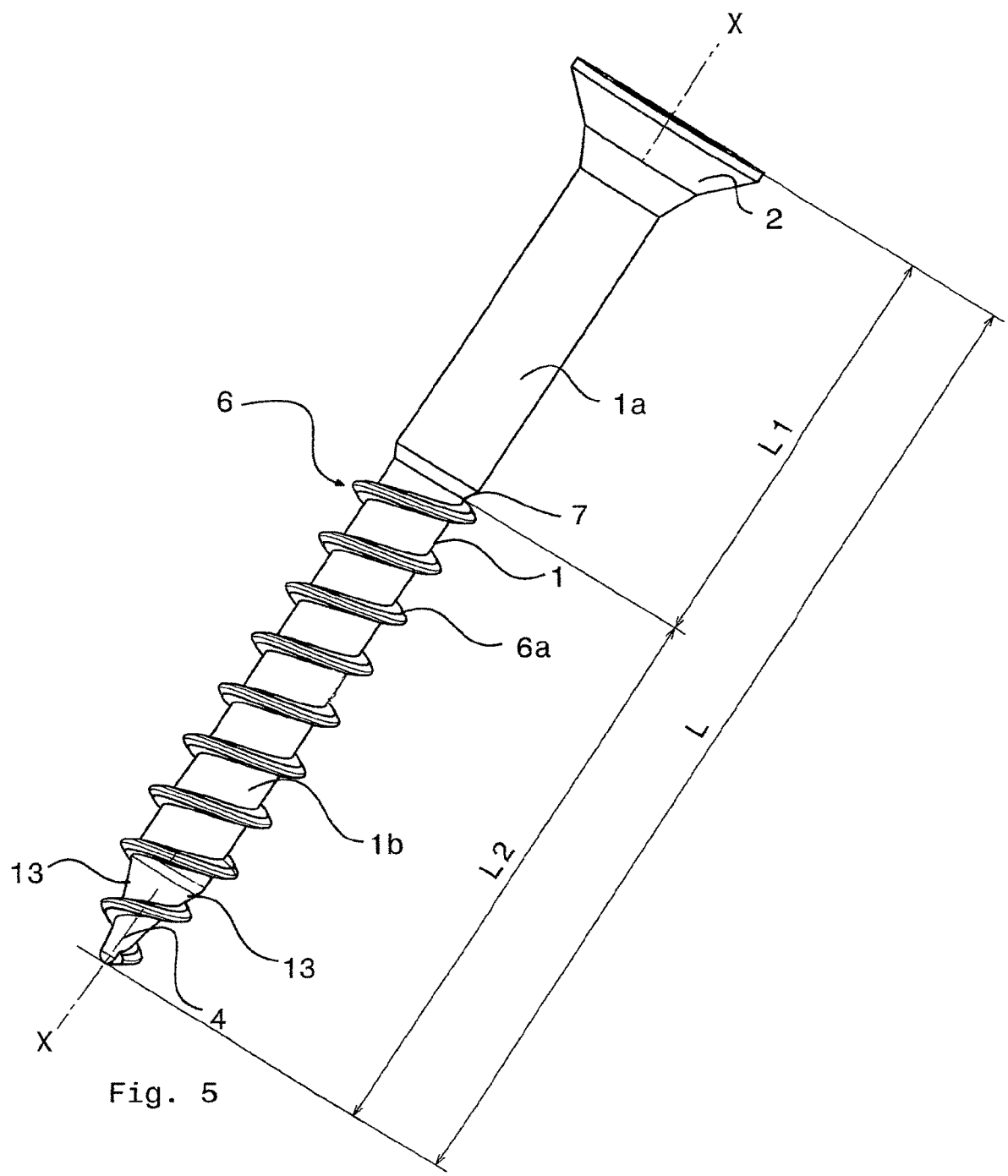

Further advantageous embodiments are cited in the subclaims. The invention will now be explained by way of the exemplary embodiment depicted in the accompanying drawings, in which FIG. 1 shows a perspective view of the inventive screw,
FIG. 2 shows a longitudinal section along line II-II in FIG. 1,
FIG. 3 shows a detail at B in FIG. 2,
FIG. 4 shows a detail at C in FIG. 2, and
FIG. 5 shows a perspective view of an inventive partial-thread screw.

In the different figures of the drawing identical parts have been marked with the same reference symbols.

In the description hereunder it is claimed that the invention is not limited to the exemplary embodiments and thus not to all or some features of the described feature combinations. Rather each individual partial feature of the/each embodiment is of importance to the subject of the invention, detached from all other partial features described in conjunction therewith, on its own and also in combination of random features of another embodiment.

Figure 2:
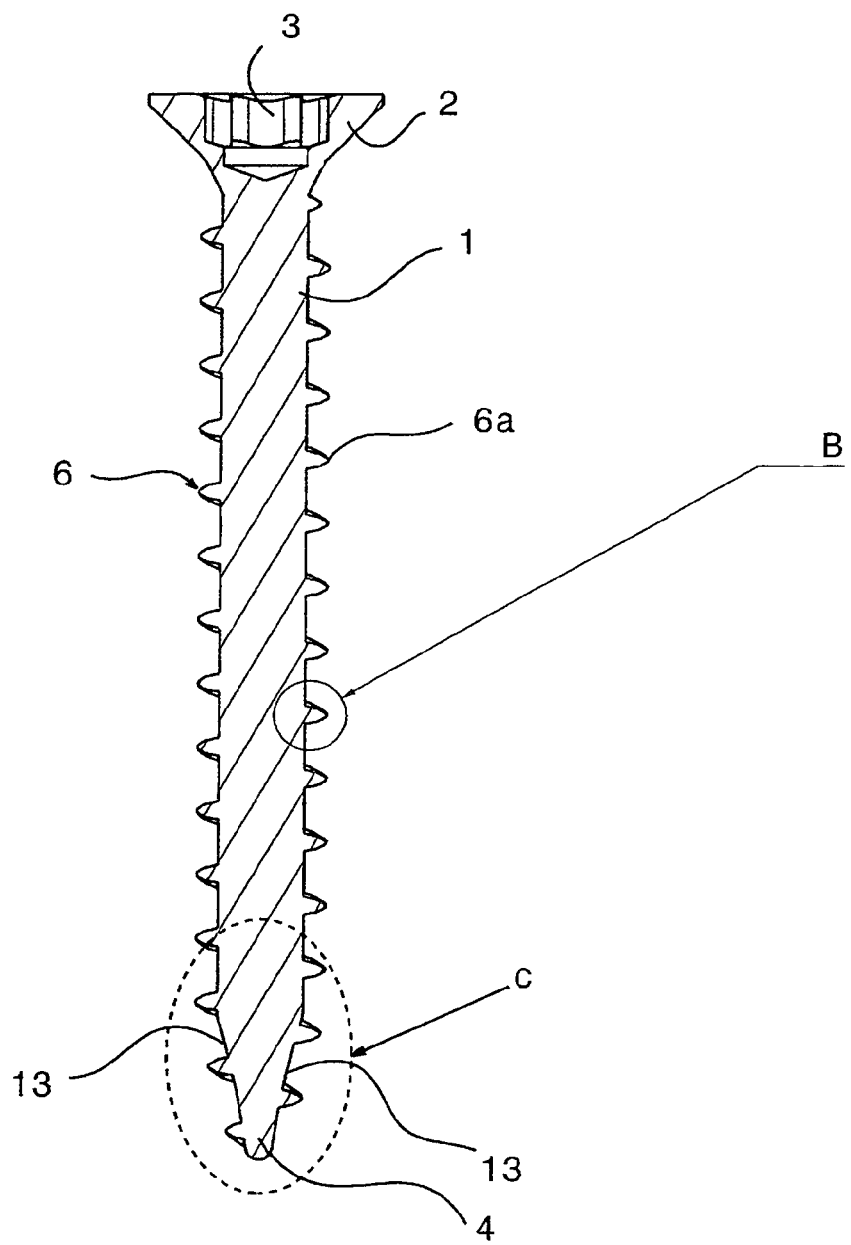

FIGS. 1 and 2 show an inventive screw, in particular of metal or reinforced plastic, in particular dowel screw. Such a screw comprises a screw shaft 1 with a total length 1. At one end the screw shaft 1 has a screw head 2 with a force application 3, and at the other end of the screw shaft 1 opposite the screw head 2 it has a screw tip 4 tapering towards its free end. Further, the inventive screw comprises a screw thread 6 extending over at least a partial portion of the screw shaft 1, which extends as far as the free end of the screw tip 4. This screw thread is configured as a self-tapping screw thread. In the embodiment shown the screw thread 6 starting at the screw head 2 extends as far as the screw tip 4, ending at the free end of the screw tip 4. The embodiment shows a single-start screw thread 6 with helically extending thread turns 6a. However it also lies within the scope of the invention if a multi-start screw thread is present on the screw shaft 1 and/or on the screw tip 4.

The thread turns 6a of the screw thread 6, viewed in longitudinal section, form a triangle when seen in cross-section with two thread flanks 8, 9 intersecting in a flank end 7 (see FIG. 4), wherein the flank end 7 is rounded-off. The nominal diameter of the screw corresponds to the outer diameter of the screw thread 6 present on the screw shaft 1, i.e. in the region of the largest outer diameter of the thread screw 6.

In the embodiment shown the screw thread 6, in the region of the thread shaft, has a thread outer diameter which is consistent throughout. In the region of the screw tip 4 the thread outer diameter in the embodiment shown reduces towards the free end of the screw tip 4.

The radius of the rounding of the rounded-off flank end 7 is 1% to 10%, in particular 2% of the nominal diameter.

As for example shown in FIG. 3, the inventive screw thread 6 may be configured such that the thread flanks 8, 9 of the thread turns 6a are formed of two flank portions 11, 12, which together enclose an obtuse angle, wherein the flank portion 11 starting at the screw shaft 1 has a radial height H1 perpendicular to the longitudinal axis X-X of the screw shaft 1, and the adjoining flank portion 12 has a radial height H2 perpendicular to the longitudinal axis X-X and ending in the rounded-off flank end 7, wherein the sum of the radial heights H1 and H2 forms the thread height H.

Advantageously the radial height H1 of the flank portion 11 is larger than/equal to 30% and smaller than/equal to 70% of the thread height H of the thread turns 6a, and the radial height H2 of the flank portion 12 is larger than/equal to 30% and smaller than/equal to 70% of the total height H of the thread turns 6a. It is of special advantage if the radial height H1 is equal to the radial height H2.

Furthermore it is of advantage, as can be recognised in particular in FIG. 4, if the screw tip 4 at its free end is rounded-off with a rounding 4a. The radius of the rounding 4a of the rounded-off screw-tip 4 is, in particular 5% to 20%, preferably 10% of the nominal diameter of the screw. As a result of the rounding, the tip is prevented from digging into the material of the dowel in case of a non-central screwing-in.

Instead the screw tip is steered into the hole of the dowel nut, in particular by slightly deforming the dowel.

Furthermore it is of advantage if the screw tip 4, viewed in longitudinal section, comprises concavely shaped side surfaces 13, so that the screw tip 4 has a concave outer contour. This has the effect of reducing the resistance when the screw is screwed into the dowel nut.

It may be convenient if, viewed in longitudinal section, the side surfaces 13 of the screw tip 4 enclose an acute angle W with a magnitude in the range of 20°-40° at the point where they intersect. In particular it is of advantage if the screw tip 4 is configured in two portions 14, 15 lying one behind the other when viewed in longitudinal direction, wherein the portion 15 ending at the free end of the screw tip 4 comprises side surfaces, which together enclose an acute angle W2 with a magnitude in a range from 10°-20°, in particular with a magnitude of 15°, and the adjoining portion 14 extending in direction of the screw head with its side surfaces encloses an acute angle W1 with a magnitude in a range from 20°-40°, in particular with a magnitude of 30°. Advantageously angle W is smaller than angle W1 and larger than angle W2. This angle dimensioning has the same effect as with a concavity.

According to the invention it is advantageous if the screw thread 6 comprises a thread pitch, which is 35% to 70%, in particular 60% to 70% of the nominal diameter of the screw. Due to forming a coarser thread and a pitch larger than 50% of the nominal diameter, in particular 60% to 70%, a noticeable increase in tightening torque is created, so that the end point for the tightening movement is distinctly felt.

In addition it may be of advantage if the pitch of the screw thread 6 in the region of the screw tip 4 as well as in a shaft region extending in direction towards the screws head 2, which is preferably ¼ to ½ of the screw-in length of the shaft portion in a dowel, is larger than in the remaining shaft region of the screw shaft 1. The result is that the dowel nut is quickly knotted.

An inventive screw is conveniently dimensioned such that the nominal diameter is 60% to 90% of a bore diameter of an existing bore in a component, in particular the outer diameter of the thread is 70% to 80% of the bore diameter.

In particular the inventive screw is dimensioned such that its outer diameter is smaller by 1 mm to 2.5 mm than the nominal diameter of a dowel, with which the inventive screw is used. The nominal diameter of the dowel corresponds to the bore diameter of a bore, into which the dowel is inserted. As a result the function of the dowel is optimised.

The screw head 2 of an inventive screw may be configured as a countersunk head, but other head shapes are possible.

When the inventive screw is configured as a partial-thread screw, the ratio $l_1/l_2$ between the length $l_1$ of the thread-free portion 1a of the screw shaft 1 ending at the screw head 2, and the length $l_2$ of the portion 1b having the screw thread 6 up to the beginning of the screw tip 4, is preferably 20/80, 50/50 or 40/60 with regard to the total length l of the screw shaft 1. Such a partial-thread screw is shown in FIG. 5, wherein this partial-thread screw, in all other respects as regards the design, may be configured as described with respect to FIGS. 1 to 4. When configured with a partial thread, this produces, in case of a blind hole, the pulling-in of the dowel nut thus causing an improvement in the retaining forces.

The invention is not limited to the exemplary embodiment shown and described, but also encompasses all embodiments having the same effect in terms of the invention. It is expressly emphasised that the exemplary embodiments are not limited to all features in combination, rather each individual partial feature may have inventive importance on its own, detached from all other partial features. Further, the invention is not limited to the feature combinations so far defined in claim 1, but may also be defined by any other random combination of certain features of all the individual features disclosed in total. This means that in principle, practically each individual feature of claim 1 may be omitted/replaced by at least one individual feature disclosed at another point in the application.

REFERENCE SYMBOLS 1 screw shaft
1a thread-free portion
1b threaded portion
2 screw head
3 force application
4 screw tip
4a rounding
6 screw thread
6a thread turns
7 flank end
8, 9 thread flanks
11, 12 flank portions
13 side surfaces
14 first portion 15 second portion
l total length of screw shaft
$l_1$ length of thread-free portion
$l_2$ length of threaded portion

The invention claimed is:

1. A screw, in particular a dowel screw, comprising a screw shaft (1) having a screw head (2) arranged at a shaft end with a force application (3) and a screw tip (4) formed at the end opposite the screw shaft (1), the screw tip tapering toward its free end, as well as with a screw thread (6) extending at least over a portion of the screw shaft (1) and over the screw tip (4), the thread turns (6a) of the screw thread comprising a triangular cross-section when viewed in longitudinal section, with two thread flanks (8, 9) intersecting in a flank end (7), characterised in that
the flank end (7) is rounded-off, wherein a radius of the rounding of the rounded-off flank end (7) is chosen to be of a magnitude from 1% to 10% of the nominal diameter of the screw and wherein the thread flanks (8, 9) are each formed of two flank portions (11, 12), which together enclose an obtuse angle,
a) wherein the flank portion (11) beginning at the screw shaft (1) comprises a radial height (H1) perpendicular to the longitudinal axis (X-X) of the screw shaft (1), and
b) the adjoining flank portion (12) comprises a radial height (H2) perpendicular to the longitudinal axis (X-X) of the screw shaft (1), and ends in the rounded-off flank end (7),
wherein the sum of the radial heights (H1, H2) corresponds to the thread height (H).

2. The screw according to claim 1, characterised in that the radius of the rounding of the rounded-off flank end (7) is 2% of the nominal diameter of the screw.

3. The screw according to claim 1, characterised in that the radial height (H1) is larger than/equal to 30% and smaller than/equal to 70% of the total height (H), and the radial height (H2) is larger than/equal to 30% and smaller than/equal to 70% of the radial total height (H).

4. The screw according to claim 3, characterised in that the radial height (H1) is equal to the radial height (H2).

5. The screw according to claim 1, characterised in that the screw tip (4) is rounded-off at its free end, wherein the radius of the rounding (4a) of the rounded-off screw tip (4) is 5% to 20% of the nominal diameter of the screw.

6. The screw according to claim 1, characterised in that the screw tip (4), at its free end in the point of intersection of its side surfaces (13), encloses an acute angle (W) with a magnitude in a range from 20° to 40°.

7. The screw according to claim 1, characterised in that the screw tip (4), at its free end viewed in longitudinal section, comprises concavely shaped side surfaces (13), so that the screw tip (4) comprises a concave outline.

8. The screw according to claim 1, characterised in that when viewed in longitudinal section, in a first region (14) adjacent to the screw shaft (1), its side surfaces (13) in their point of intersection, enclose an acute angle (W1) with a magnitude in a range of 20° to 40°, and in a second adjoining region (15) extending as far as the free end of the screw tip (4), its side surfaces (13) enclose an acute angle (W2) with a magnitude in a range from 10° to 20°, wherein in particular the angle (W) is smaller than the angle (W1) and the angle (W) is larger than the angle (W2).

9. The screw according to claim 1, characterised in that the screw thread (6) comprises a pitch, which is 35% to 70% of the nominal diameter of the screw thread (6).

10. The screw according to claim 1, characterised in that the pitch of the screw thread (6) in the region of the screw tip (4) as well as in a shaft region adjoining the screw tip (4), which in particular is ¼ to ½ of a screw-in length of the screw shaft (1) in a dowel, is larger than in the remaining shaft region of the screw shaft (1).

11. The screw according to claim 1, characterised in that the flank portions (8, 9), in the region of the surface portions (11) with the radial height (H1) enclose an acute angle of 20° to 40°.

12. The screw according to claim 1, characterised in that the flank portions (8, 9) with their surface portions (12) with the radial height (H2) together enclose an acute angle of 50° to 70°.

13. The screw according to claim 1, characterised in that the diameter of the screw thread (6) reduces over the length of the screw tip (4) to the free end thereof.

14. The screw according to claim 1, characterised in that the screw thread (6) is formed only over a partial length ($l_2$) of the screw shaft (1) beginning at the screw tip (4) and comprises an adjoining thread-free shaft portion (1a).

15. The screw according to claim 1, characterised in that the ratio ($l_1/l_2$) of the length ($l_1$) of the thread-free shaft portion (1a) to the length ($l_2$) of the shaft portion (1b) having the screw thread (6) is, with regard to the total length (l) of the thread shaft (1), ($l_1/l_2$)=20/80 or 50/50 or 40/60.

16. The screw according to claim 1, characterised in that it is made of metal or reinforced plastic.

17. A combination of a screw according to claim 1 and a dowel, characterised in that the outer diameter of the screw thread (6) in the region of the screw shaft (1) is constant and is smaller by 1 mm to 2.5 mm than the nominal diameter of the dowel to be used with the screw.

18. A screw, in particular a dowel screw, comprising a screw shaft (1) having a screw head (2) arranged at a shaft end with a force application (3) and a screw tip (4) formed at the end opposite the screw shaft (1), the screw tip tapering toward its free end, as well as with a screw thread (6) extending at least over a portion of the screw shaft (1) and over the screw tip (4), the thread turns (6a) of the screw thread comprising a triangular cross-section when viewed in longitudinal section, with two thread flanks (8, 9) intersecting in a flank end (7), characterised in that
the flank end (7) is rounded-off, wherein a radius of the rounding of the rounded-off flank end (7) is chosen to be of a magnitude from 1% to 10% of the nominal diameter of the screw and,
the screw tip (4), at its free end when viewed in longitudinal section,
a) comprises concavely shaped side surfaces (13), so that the screw tip (4) has a concave outline or,
b) its side surfaces (13) in a first region (14) adjacent to the screw shaft (1), enclose an acute angle (W1) with a magnitude in a range from 20° to 40° in their point of intersection, in particular with a magnitude of 30°, and in an adjoining second region (15) extending as far as the free end of the screw tip (4) its side surfaces (13) enclose an acute angle (W2) with a magnitude in a range from 10° to 20°, preferably with a magnitude of 15°, wherein the angle (W) is smaller than the angle (W1) and the angle (W) is larger than the angle (W2).

19. The screw according to claim 18, characterised in that the thread flanks (8, 9) are each formed of two flank portions (11, 12), which together enclose an obtuse angle, wherein the flank portion (11) beginning at the screw shaft (1) comprises a radial height (H1) perpendicular to the longitudinal axis (X-X) of the screw shaft (1), and the adjoining flank portion (12) comprises a radial height (H2) perpendicular to the longitudinal axis (X-X) of the screw shaft (1), and ends in the rounded-off flank end (7), wherein the sum of the radial height (H1, H2) corresponds to the thread height (H).

\* \* \* \* \*